No. 610,186. Patented Sept. 6, 1898.
J. L. KNOLL,
BICYCLE SUPPORT.
(Application filed June 24, 1897.)

(No Model.)

Witnesses
C. J. Williamson
Geo. H. Brooks

Inventor
Jonas L. Knoll
per Chas. H. Fowler
Attorney

UNITED STATES PATENT OFFICE.

JONAS L. KNOLL, OF LEBANON, PENNSYLVANIA.

BICYCLE-SUPPORT.

SPECIFICATION forming part of Letters Patent No. 610,186, dated September 6, 1898.

Application filed June 24, 1897. Serial No. 642,035. (No model.)

*To all whom it may concern:*

Be it known that I, JONAS L. KNOLL, a citizen of the United States, residing at Lebanon, in the county of Lebanon and State of Pennsylvania, have invented certain new and useful Improvements in Supports for Bicycles; and I do hereby declare that the following is a full, clear, and exact description of the same, reference being had to the annexed drawings, making a part of this specification, and to the letters of reference marked thereon.

The present invention consists in a support for bicycles to hold the bicycle in an upright position after dismounting, said support also serving as a carrier for packages, bundles, or other articles when the support is swung up to a horizontal position, as will be hereinafter described and claimed.

Figure 1:
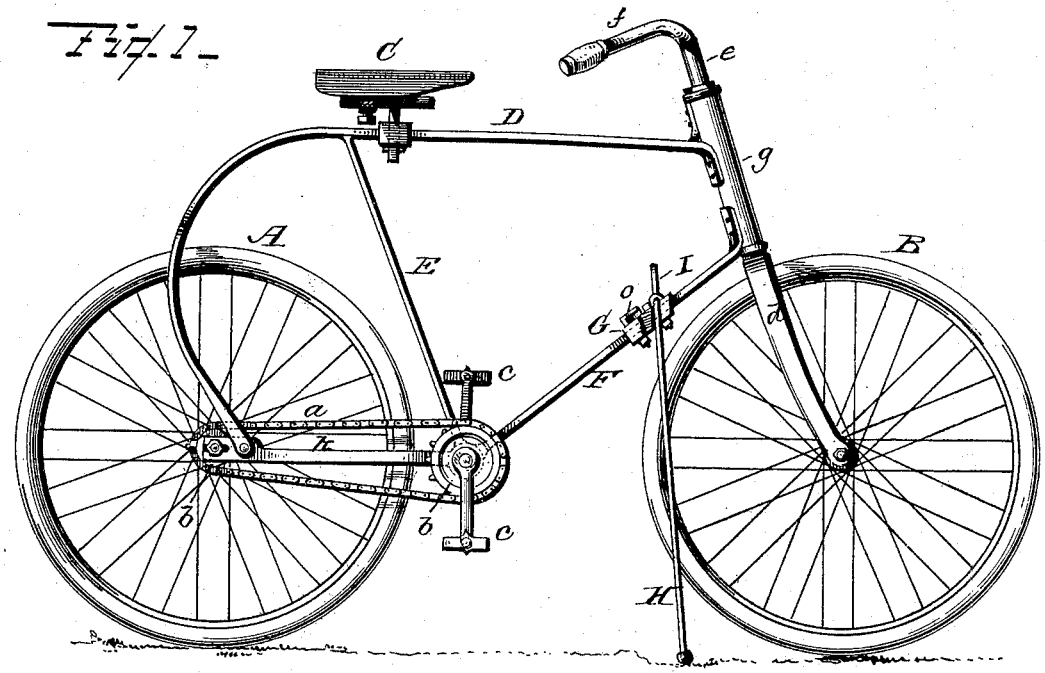
Figure 2:
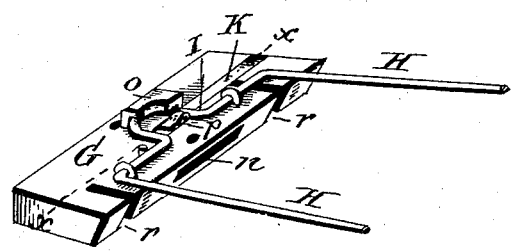
Figure 3:
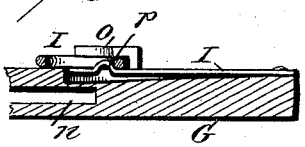

Figure 1 of the drawings is a side elevation of a bicycle, showing my improved support connected thereto; Fig. 2, a detail view in perspective of the support and its attachments; Fig. 3, a longitudinal section taken on line $x\ x$ of Fig. 2.

In the accompanying drawings, A B represent the rear and front wheels of a bicycle, $a$ the sprocket-chain and $b$ the sprocket-wheels, and $c$ the pedals.

The front fork $d$ has the steering-rod $e$, which is provided with the handle-bars $f$, said rod extending through the tubular sleeve $g$. The spring-frame of the bicycle comprises the bar D, to which the seat C is connected, and the braces E F, the spring-bar D connecting with the usual rods $k$, and the forward ends of said bar and the brace F connecting with the sleeve $g$.

The present description of bicycle is one of many forms to which my improved support may be applied. The support consists in part of the block G, adapted for attachment to any part of the frame of a bicycle, but in the present instance to the spring-brace F, which is adjustably connected thereto by means of set-screws, bolts, and nuts, or any other preferred means, the brace extending through the slot $n$.

The rods H, which may be of any suitable thickness, are connected at their upper ends by a looped head I, which is pivotally connected to the upper side of the block G in any suitable and well-known manner that will admit of the head I sliding laterally.

In the position shown in Fig. 2 the rods H are held in a horizontal position, the looped end of the head I extending under a keeper $o$ and held in engagement therewith by a shouldered spring K. This spring K is seated in a mortise formed in the upper side of the block G and connected at its outer end to said block, the shoulder $p$ of the spring bearing against the side of the loop to prevent the head from sliding laterally.

The sides of the shoulder $p$ of the spring K are inclined, so that by a little pressure in either direction upon the head I the loop will easily ride over the shoulder and release or engage itself from the keeper, as the case may be.

In the position shown in Fig. 2 the rods of the support may be used to suspend bundles from or support them or packages by placing them crosswise upon the rods as convenience would suggest. When the rods H are brought in position to support the bicycle in an upright position, as shown in Fig. 1 of the drawings, said rods engage with the slots $r$ to hold them from moving laterally.

Having now fully described my invention, what I claim as new, and desire to secure by Letters Patent, is—

A support for bicycles, consisting of a suitable block connected to the frame of the bicycle, rods connected by a looped cross-head pivotally and slidably connected to the block, a keeper and spring for holding the rods in a horizontal position, and slots in the block with which the rods engage when in a vertical position, substantially as and for the purpose described.

In testimony that I claim the above I have hereunto subscribed my name in the presence of two witnesses.

JONAS L. KNOLL.

Witnesses:
 T. R. SHEPPARD,
 LOUIS H. LEE.